United States Patent Office 3,736,201
Patented May 29, 1973

3,736,201
METHOD FOR MOLDING BOWL-SHAPED
ARTICLES
Shoichi Teraoka, 5–32 Nishi 2-chome, Senriyama,
Suita-shi, Osaka, Japan
Filed Nov. 19, 1970, Ser. No. 91,028
Int. Cl. B29c 17/07; B32b 31/20
U.S. Cl. 156—145          8 Claims

ABSTRACT OF THE DISCLOSURE

A method of molding bowl-shaped plastic articles having a multi-layer wall structure is disclosed. In the present method a parison is supplied to the space between the male and female members of a split mold, at least one of which members includes a shelly-shaped mold slidably mounted thereon for engagement with the other member. The shelly-shaped mold is moved into engagement with the other member while holding the parison in position between the male and female members to thereby close the upper and lower edge portions of the parison while confining the parison within a limited space that is defined by the shelly-shaped mold and by the inner walls of the male and female members. The split mold is fully closed by bringing the male and female members into final engagement with each other and concurrently therewith, introducing air under pressure into the interior of the parison to cause the parison to engage fully the inner walls of the members and to conform to the shape and configuration thereof.

BACKGROUND OF THE INVENTION

Heretofore, it has been known to produce bottles and other articles from a synthetic resinous materials by blow molding. In this method, a molten synthetic resinous material is extruded in tubular form, for example, from the T-die of an extruder, a bag-shaped molding material heated and softened to near the melting point thereof form being hereinafter referred to as a parison. The parison is supplied to opposed members of a split mold disposed immediately below the extruder. As the parison is introduced between the members of the split mold and the mold is closed, air under pressure is concurrently supplied to the parison to expand it so that it may conform to the shape and configuration of the inner walls of the mold. After the shaped parison is cooled for a predetermined period of time, the mold is opened to provide a molded article.

Blow-molded articles of relatively small depth and light weight and having a fused and bonded region in a portion of their walls can be produced by the conventional blow-molding method described above, although a considerable loss of material is inevitable with this process.

However, it is not possible to produce by the blow-molding method bowl-shaped articles of large depth, size and weight. Because of the draw-down effect on the parison by its heavy weight, the molded article may lack uniformity in wall thickness. In addition, the parison is liable to be damaged when the male and female members of a split mold of large depth are brought into engagement with each other in closing the mold, making it impossible to produce molded articles commercially satisfactory.

Figure 1:
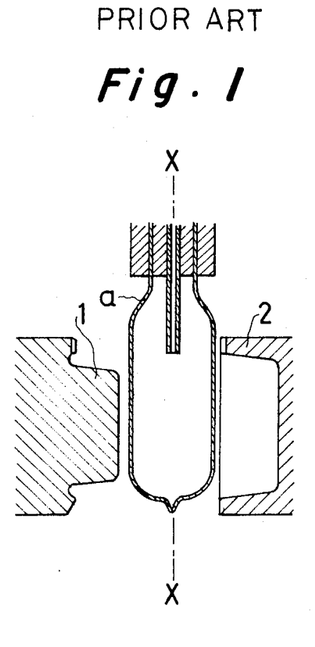
FIGS. 1 to 3 are partial cross-sectional views in explanation of the production of a bowl-shaped plastic article by a blow-molding method of the prior art.
Figure 2:
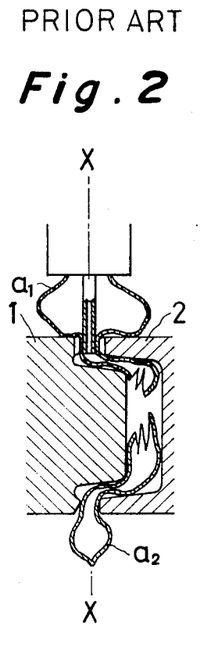
Figure 3:
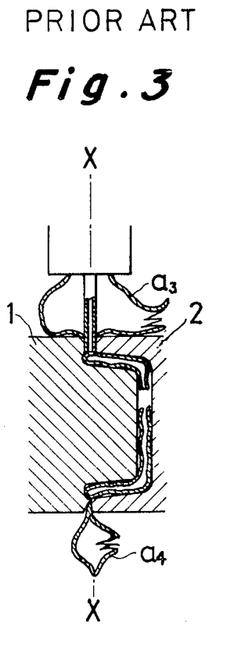
Figure 4:
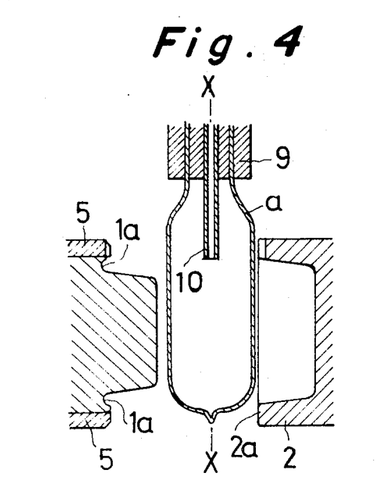
FIGS. 4 to 7 are front elevational and sectional views of a bowl-shaped plastic article molded in accordance with this invention.

The results of experiments in the production of a bowl-shaped article by the blow-molding method of the prior art will be explained with reference to FIGS. 1 to 3. A parison $a$ is supplied to a space between a male member 1 and a female member 2 of a split mold and the two members 1 and 2 are moved toward each other to close the mold along a line X—X. When the closing of the mold is started (FIG. 2), the parison $a$ is brought into contact with at least one of the members. Thus, the parison $a$ is pushed by the angle portions at the entrance to the mold or the irregularities therein and the inner pressure of the parison is increased as the closing of the mold proceeds. This may cause swelling-out of the parison as illustrated at $a_1$ and $a_2$ in FIG. 2 before completion of the closing of the mold, or a protrusion of the parison from the opposite surfaces of the members 1 and 2 of the mold as shown at $a_3$ and $a_4$ in FIG. 3, upon completion of the closing of the mold. When this is the case, the portions of the parison both in and out of the mold inevitably have a markedly reduced thickness or are damaged and the molded articles obtained are not satisfactory for commercial specifications and orders even if air under pressure is supplied to the interior of the parison after the mold is closed.

In another known method of producing molded articles of a dual wall structure, the inner and outer walls may be produced separately as by vacuum molding or injection molding and are bonded together to produce the desired article. This process, however, is not desirable because it involves the bonding of large areas of the walls together and the processing operation is troublesome and time-consuming.

Moreover, in producing articles by injection molding, the flow of a molten resin, effected by means of high pressure injection at 1000–1500 kg./sq. cm., is directional and the resulting products have a weld line, alterations in the final products occurring as a result of residual stresses imparted during processing. The resin initially projected into the cavity of a mold is maintained in contact with the inner surfaces of the mold for a longer interval of time than the resin subsequently projected into the cavity, and the former is forced into the cavity by the latter. Thus, the resin projected into the mold in the initial stages of the operation and the resin projected into the mold in the later stages are cooled differently, so that molecular bonding therebetween is not satisfactorily obtained, the produced articles having a large depth particularly showing a difference in strength between the upper marginal portion and the bottom portion thereof. Also, the extruder and its metal mold in the aforementioned injection molding machine are expensive, because of the high pressure molding involved and of the large consumption of power, with the resultant higher manufacturing cost of the product.

SUMMARY OF THE INVENTION

This invention overcomes the disadvantages of the prior art by providing a method and an apparatus for molding bowl-shaped plastic articles which utilize blow molding and direct pressure application for producing especially molded articles of extra-large size and having a multi-layer wall structure, such as boats, bath-tubs, and the like. Containers of large size, having for example, a high strength and high heat insulating characteristics, which have hitherto been impossible to produce by known molding methods, are now readily manufacturable. According to this invention, such articles may be produced by using inexpensive equipment without incurring in the drawbacks experienced when a conventional blow-molding method or other known molding method was used. It is not required, according to this invention, to prepare the inner and outer walls of an article separately and then to bond them together to provide the final article. According to the present invention, there is provided a method of molding bowl-shaped articles in which a parison or other bag-shaped material is supplied to a space between male and female members of a split mold juxtaposed to each other. A cylindrical or hollow prism-shaped (hereafter defined as "shelly-shaped") mold, slidably mounted on one of such members of the mold is first brought into contact with the other member of the split mold so as to close the otherwise open peripheral regions of the female and male members and to form a limited space defined by the female and male members of the mold and the shelly-shaped mold. Air is introduced into the parison or other bag-shaped material disposed in such space to expand the same and then the female and male members are moved toward each other to close the split mold, so that the parison is made to conform to the shape and configuration of the inner walls of the split mold while the limited space is reduced in size by maintaining the air pressure in the parison at the predetermined level required for producing the desired article.

Additional objects and advantages of the invention will become evident from the disclosure set forth hereinafter when considered in conjunction with the accompanying drawings.

DESCRIPTION OF PREFERRED EMBODIMENTS

The basic manner of carrying out the method of molding bowl-shaped plastic articles according to this invention may be described as follows: As shown in FIGS. 4 to 7, a parison $a$ extruded from the T-die of an extruder is supplied to a space between a male member 1 and a female member 2 of an open split mold juxtaposed to each other. A shelly-shaped mold 5 is slidably mounted on the outer peripheral surface of the male member 1. The female member 2 juxtaposed to the mold 5 is moved together with the male member toward a mold closing line X—X while the parison is still in a fluid state, so that the parison $a$ is closed at its upper and lower portions or at its peripheral portions by the female member 2 of the split mold and the shelly-shaped mold 5 (see FIG. 5). A limited space is, thus, defined by the shelly-shaped mold 5 and the female member 2 and male member 1 of the split mold and the parison is sealed within such limited space. Preferably, the limited space has a volume substantially equal to that of the cavity of the split mold, because the parison may be wrinkled when the split mold is closed by moving the male member toward the female member and the wrinkles remain in the molded article if there is too great a difference in volume between the limited space and the cavity of the split mold. As required, a predetermined amount of air under pressure is introduced into the interior of the parison through an air supply line 10 of a die 9 so as to expand the parison in the limited space. At the same time, the male member 1 sliding on the shelly-shaped mold 5 is advanced slowly to a closing position of FIG. 6 and hence to a final position of FIG. 7 in which the parison in the closed split mold is made to conform to the shape and configuration of the inner walls of the split mold. In the FIGS. 4–7, the limited space is shown as being formed by the shelly-shaped mold 5 sliding on the outer peripheral surface of the male member 1 and by the female member 2; however this combination may be reversed.

More specifically, the shelly-shaped mold 5 may be slidably mounted on the outer peripheral surface of the female member 2 and moved toward the male member 1 into engagement therewith, or a shelly-shaped mold 5 may be slidably mounted on the outer peripheral surface of each male and female member 1 and 2 (FIG. 10) and the two shelly-shaped molds 5 may be moved toward the X—X line into engagement with each other on such line.

Preferably, the air in the parison is vented through an exhaust valve (not shown) to maintain the air in the parison at a predetermined pressure as the male and female members are moved toward each other to close the split mold. The exhaust valve may be provided in a branch of the air duct 10. Alternatively, the air inlet formed in the molded article may be connected to another duct as soon as the extruder is withdrawn and the air feeding duct is disconnected from the inlet to reduce the pressure in the parison in order that the molding operation may be performed in less time than would otherwise be necessary.

In the present invention, the parison to be supplied to the cavity of the split mold is properly supported in the limited spaced defined by the male and female members and the shelly-shaped mold by hanging in such a manner that it occupies a maximum space and prevents sagging as much as possible.

Figure 11:
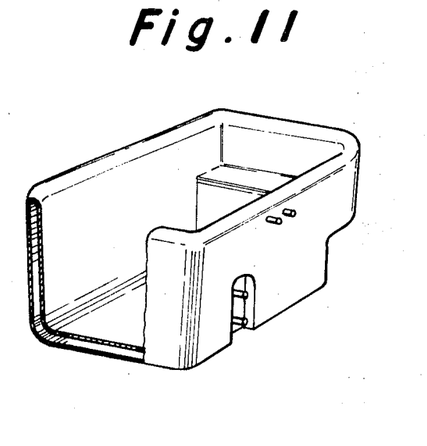
FIG. 11 is a perspective view, partly in cross-section, of a bath-tub produced by the method according to this invention and showing a hollow space between the inner and outer walls.
Figure 12:
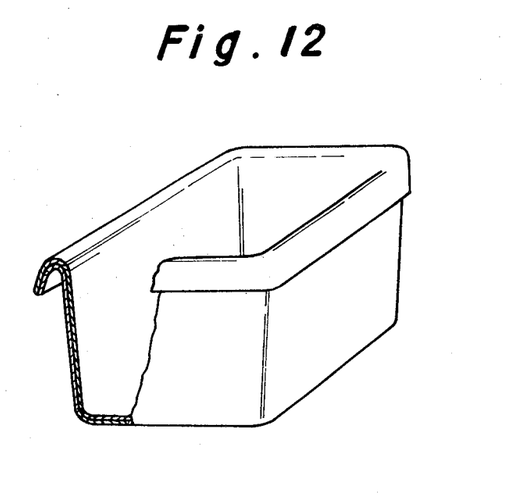
FIGS. 12 and 13 show other embodiments of the bath-tub produced by the method according to this invention, FIG. 12 showing an embodiment in which the inner and outer walls are fused and bonded together and FIG. 13 showing an embodiment in which the hollow space between the inner and outer walls is filled with a foamed material.
Figure 13:
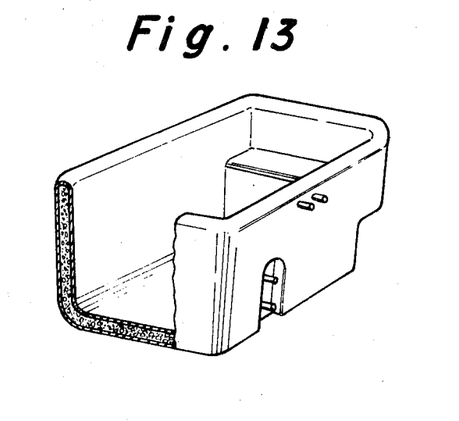
Figures 14, 15:
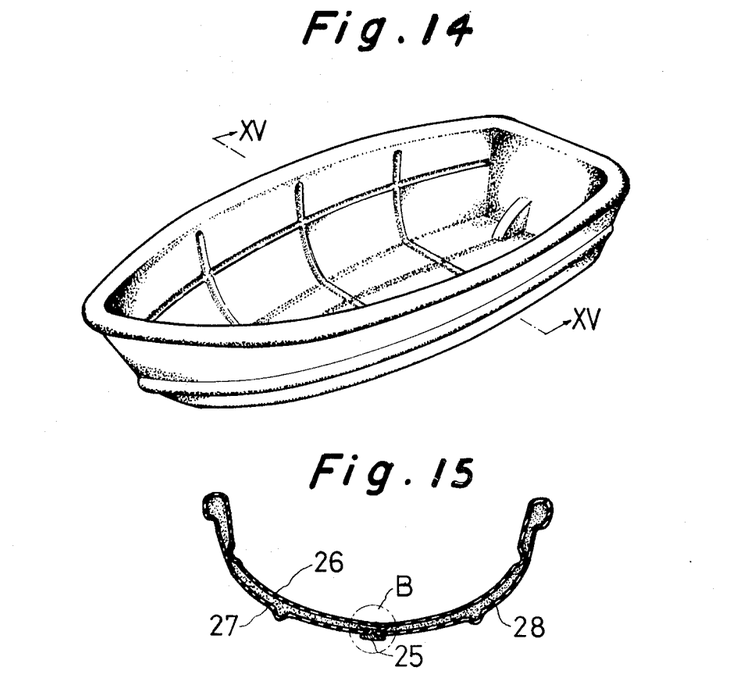
FIG. 14 is a perspective view of a large boat molded by the method according to this invention.
FIG. 15 is a sectional view taken along the line XV—XV of FIG. 14.

In this way, it is possible to produce a molded article, such as a bath-tub, having a hollow space in which the inner and outer walls are turned upwardly and are contiguous with each other as shown in FIG. 11, or in which the inner and outer walls are fused and bonded to each other over the entire area as shown in FIG. 12, or in which a foamed resin is poured in the hollow space between the inner and outer walls, as shown in FIG. 14, all with a relatively low molding pressure of about 2 to 5 kg./cm.$^2$.

The molded plastic articles according to this invention have the same beautiful luster appearance as the articles produced by injection molding. The molecules of the plasticized articles, which are high polymeric compounds are connected together and oriented uniformly, so that the molded articles of this invention are free from the disadvantages of articles produced by injection molding. The articles molded according to this invention are also characterized by uniform wall strength and the walls have a much greater strength than the comparable walls of articles produced by injection molding. This invention offers particular advantages in producing large-sized molded articles, such as boats or bath-tubs, which must have very high strength, because such articles do not undergo deformation over a long period of time due to the very low residual stresses produced during molding and to the flow of resin which is not directional. Thus, this invention permits the ready production of multi-layered molded articles by using low pressure air. The multilayer molded articles are particularly advantageous because the wall structure imparts a high strength thereto and renders them heat insulating.

Figure 8:
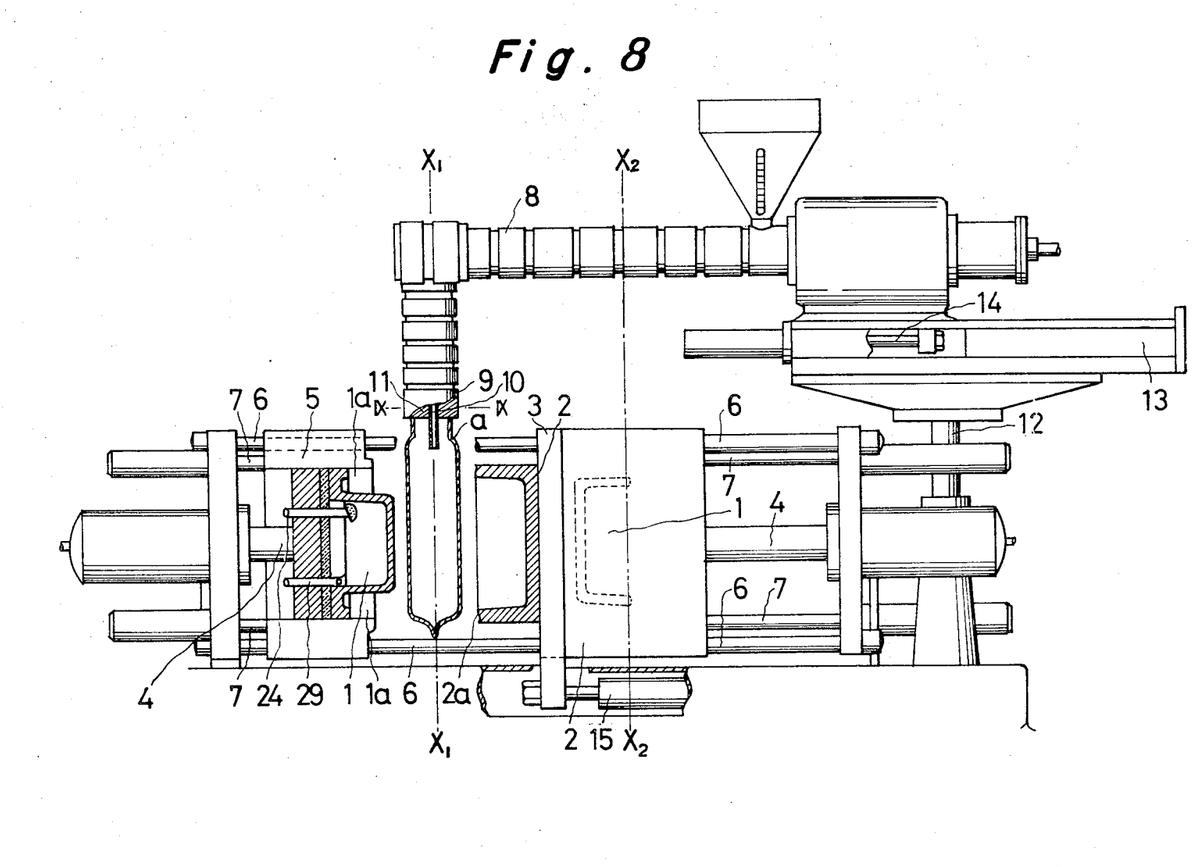
FIG. 8 is a front view, partly in cross-section, of one embodiment of the apparatus used for carrying out the method of this invention.

One embodiment of the apparatus for producing plastic articles by molding according to this invention is shown in FIG. 8.

Figure 5:
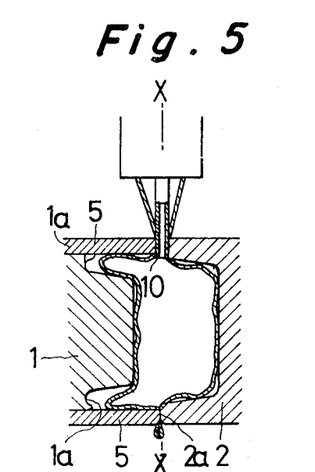
Figure 6:
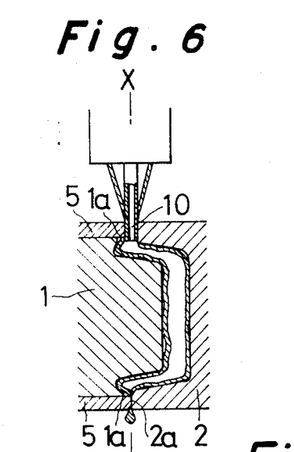
Figure 7:
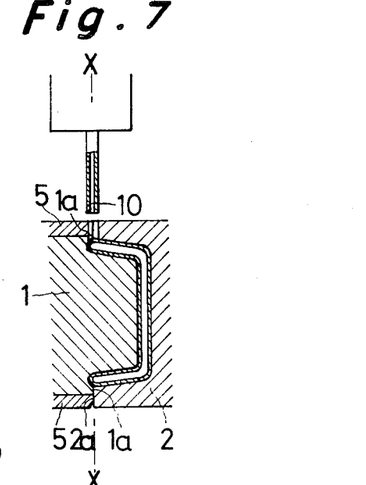

Two split molds each comprising a male member 1 and a female member 2 are arranged in end to end relation, so that the male members 1 and female members 2 are moved toward one another to close the molds at lines $X_1$—$X_1$ and $X_2$—$X_2$ respectively. The female members 2 are mounted on a stool 3 disposed in the center of the apparatus, and the male members 1 are connected to the forward ends of hydraulic rams 4 respectively disposed on opposite sides of the apparatus. A shelly-shaped mold 5 cooperates, when closed, with the male member 1 and female member 2 of one of the two split mold to define a limited space as shown in FIG. 5. The shelly-shaped mold 5 is slidably carried by bars 6 disposed in parallel relation and slidably mounted on opposite sides of the male member 1 of one of the two split molds.

Figure 9:
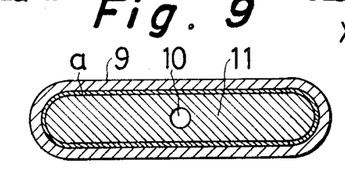
FIG. 9 is a sectional view taken along the line IX—IX of FIG. 8.

A hydraulic ram 7 is provided for moving the shelly-shaped mold 5, back and forth. An extruder 8 is disposed above the split molds described above and is provided with a T-die 9 which is constructed such that the parison $a$ is extruded therefrom in tubular wide elliptical shape as shown cross-sectionally in FIG. 9. The T-die 9 has a torpedo 11 housed therein for forming a material into a shape closely resembling the shape of an article to be produced by molding. Preferably, the T-die has a parison forming portion which has a large transverse area so as to provide walls of uniform thickness to molded articles of large size and the parison forming portion is constructed such that its peripheral walls are capable of increasing the parison supporting capacity of the die so as to prevent sagging of the parison by its own weight.

One or more compressed air inlet and outlets 10 are formed in the center of the torpedo which passages are connected to a pressure adjusting valve and an air compressor (not shown). The extruder 8 is mounted on a platform 13 secured to the upper portion of a hydraulic ram 12 and adapted to be moved in reciprocating motion (right and left in FIG. 8) by another hydraulic ram 14. This arrangement permits to alternately supply from the T-die 9 a tubular parison $a$ of large width to the space between the male and female members 1 and 2 of one split mold and to the space between the male and female members 1 and 2 of the other split mold. It is to be understood that a single split mold or more than two split molds may be provided in place of the two split molds shown and described herein.

A hydraulic device 15 is provided for moving the mold closing mechanism as desired through an intermediate stool 3. The hydraulic device 15 is adapted to move the whole mold mechanism to a suitable position on the base determined by the shape of the cavity of each of the split molds, on both sides of the intermediate stool 3, so that the shelly-shaped mold 5 and the member 2 of the split mold juxtaposed thereto may be moved toward each other to close on the line $X_1$—$X_1$ or on the line $X_2$—$X_2$ when the parison extruded from the extruder is supplied to the space between the members of the split molds and when the shelly-shaped mold is moved into contact with one of the members of each of the split molds prior to the closing of the split mold. In the embodiment described, the shelly-shaped mold 5 is mounted on the male member 1 of each split mold and moved toward the female member 2 of each split mold into contact therewith. At this time, the female member 2 must be moved simultaneously with the shelly-shaped mold toward the centerline $X_1$—$X_1$ of the parison through the intermediate stool 3 in order that the shelly-shaped mold 5 may not offer a one-sided pressing resistance to the pending parison. The hydraulic ram 15 and the hydraulic ram 14 which moves the extruder are actuated in association with each other so as to move the mold closing mechanism as a whole or only the extruder and to close the molds along the lines $X_1$—$X_1$ and $X_2$—$X_2$ respectively, so that the parison $a$ may not be damaged.

The following are examples of production of bowl-shaped plastic articles by molding by using the method according to this invention:

A tubular parison $a$ of large width is extruded from the downwardly directed T-die 9 of the extruder 8 and moved perpendicularly into the space between the spaced-apart male and female members of a split mold. The hydraulic ram 15 is first actuated to move the shelly-shaped mold 5 and the female member 2 of the split mold toward each other so as to hold the parison $a$ between the shelly-shaped mold and a contact surface 2a of the female mold 2 to close the upper and lower portions of the parison by fusion and bonding. At this time, one or more air supply lines 10 are disposed in the upper edge of the parison and the remainder of the peripheral surfaces is closed. The bottom edges may be either closed by fusion or left open.

As aforementioned, a limited space defined by the shelly-shaped mold 5, the female member 2 and the male member 1 in stand-by position in the shelly-shaped mold 5 is formed as the shelly-shaped mold 5 is brought into engagement with the female member 2 prior to the closing of the split mold (see FIG. 5). During the process, air under pressure of about 1 to 5 kg./cm.$^2$ (sufficient to maintain the integrity of the tubular parison $a$ in the limited space) is supplied from a compressed air source (not shown) to the interior of the tubular parison $a$ through the compressed air passages 10 of the T-die 9. This is effective to maintain the thickness of the parison uniform and prevent the walls of the hollow portion of the parison from adhering to each other by maintaining the amount and pressure of the air in the parison at predetermined levels when the parison is enclosed by the member of the split mold. Deformation of the parison in conformity to a change in the shape of the limited space may be facilitated when the male member 1 is moved toward the female 2 to close the split mold as subsequently described. Furthermore, the pressurized air can be heated or cooled if necessary.

Subsequently to the parison closing step, the mold closing hydraulic ram 4 connected to the rear side of the male member 1 is actuated to move the male member 1 toward the female member 2 so that the parison sealed in the limited space may be made to conform to the shape and configuration of the inner walls of the split mold and molded into a bowl-shaped article. During the aforementioned step, the inner pressure of the parison rises, but the air in the parison is vented to the outside through the air passages 10 and pressure reducing valves (not shown) as the male member 1 is moved toward the female member 2 to close the split mold, whereby the inner pressure of the parison can be maintained constant. In order to carry out this step in a shorter period of time, the molded article in the split mold may be cooled while maintaining the air therein at the predetermined level, or the hydraulic ram 12 supporting the parison supply device may be actuated to raise the device upwardly as soon as cooling is initiated so as to effect a cooling of the molded article sufficiently by connecting the same to a separate pressurized air supply device through an air passage hole in the molded article.

By the aforementioned process, the parison can be formed into an article of the desired shape under a predetermined air pressure. However, when the article is either fully of the hollow type or of the partially hollow type, that is, with portions of the hollow space bonded by fusion, it is desired to increase the precision of the molding. To this end, when the closing of the split mold is completed as shown in FIGS. 4 to 7, the upper and lower portions of the parison closed by the engaging surfaces of the male and female members of the split mold are severed by the shoulder 2a of the female member 2 and by the outer peripheral shoulder 1a of the male member 1, and at the same time air under high pressure is introduced into the parison through the upper air passages 10 to force the parison into conformity with the shape and configuration of the inner walls of the split mold. To complete the molding cycle, the molded article is allowed to cool till the next cycle. When the upper and lower or side portions of the parison are severed by fusion as aforementioned, the parison supply device may be moved to the next operational position by venting the air supply opening of the molded article or by connecting the molded article to a separate air supply device for supplying cooling air under high pressure to the molded article to rapidly cool the same.

Upon completion of one molding cycle, the hydraulic ram 12 is actuated to raise the extruder 8 upwardly and the hydraulic ram 14 is actuated to move the extruder 8 on the stool 13 into a position where it is aligned with the mold closing line $X_2$—$X_2$ of the next split mold for performing a molding operation again.

As aforementioned, the extruder is moved to the mold closing mechanism of the next split mold when the molding operation of the first split mold is completed and the article produced is being cooled and allowed to set. During this period, the split mold in which the article has been molded and cooled is opened and the article is removed from the mold, so that another parison can be supplied and another molding can be performed again. Thus, the supply of parisons and the molding of the articles are performed in succession using a plurality of split molds, and the extruder can perform a continuous molding operation by moving in a reciprocating motion. According to this arrangement, a sufficiently long period of time is allowed to each split mold for cooling the molded article making it possible to produce molded articles of high precision.

It is to be understood that the mold closing the molding mechanism described above may be used in a plurality of sets which may be arranged in end to end relation or in a circle. The split molds used in this invention may each be provided with suitable cooling and heating means. Preferably, means are provided for adjusting the air around the split molds and the air introduced under pressure into the parison.

The male member 1 of each split mold may be hollow in its interior as shown in FIG. 8 and heated steam may be introduced therein directly to suitably heat the outer surface of the member. Upon completion of the molding, heated steam is replaced by cooling water. If similar means are provided to the female member 2, control of the temperature on the surfaces of the split mold can be readily effected. This arrangement is recommendable to the production of plastic articles of very large size.

It is advantageous in producing plastic articles of large size that a parison be supplied by an extruder which is moved downwardly when the parison is introduced in the space between the members of the split mold, and that such supply of parison be effected through a die having a large cross-sectional area. Molding of articles of large size naturally requires a parison of large size. A portion of the parison of large size which is disposed near the outlet of the die or following portion is soft and tends to be elongated by the weight of the parison itself when the parison is extruded through the die. The elongation and consequent sagging of the parison can be prevented by moving the extruder downwardly at a rate greater than the rate at which the parison is extruded through the die. Moreover, the extruder 8 as a whole is moved up and down by the hydraulic ram 12 while the parison is supplied and the rate of movement of the extruder can be adjusted. The parison is supplied from the extruder in tubular form of large cross-sectional area and, as a result, a high supporting force is produced on the inner surface of the parison forming portion of the die, making it possible to obtain a uniform wall thickness in plastic articles of large size.

The description set forth hereinabove refers to the embodiments of the method and apparatus for supplying a parison through the T-die of the extruding machine to a space between the members of the split mold for performing a molding operation. It is to be understood that the present invention is not limited to this manner of supply of a material to be molded and that a plurality of webs of a thermoplastic material may be formed into a bag-shaped member while heating and softening the same. Such bag-shaped thermoplastic material may be supplied in place of a parison to the split mold.

Figure 10:
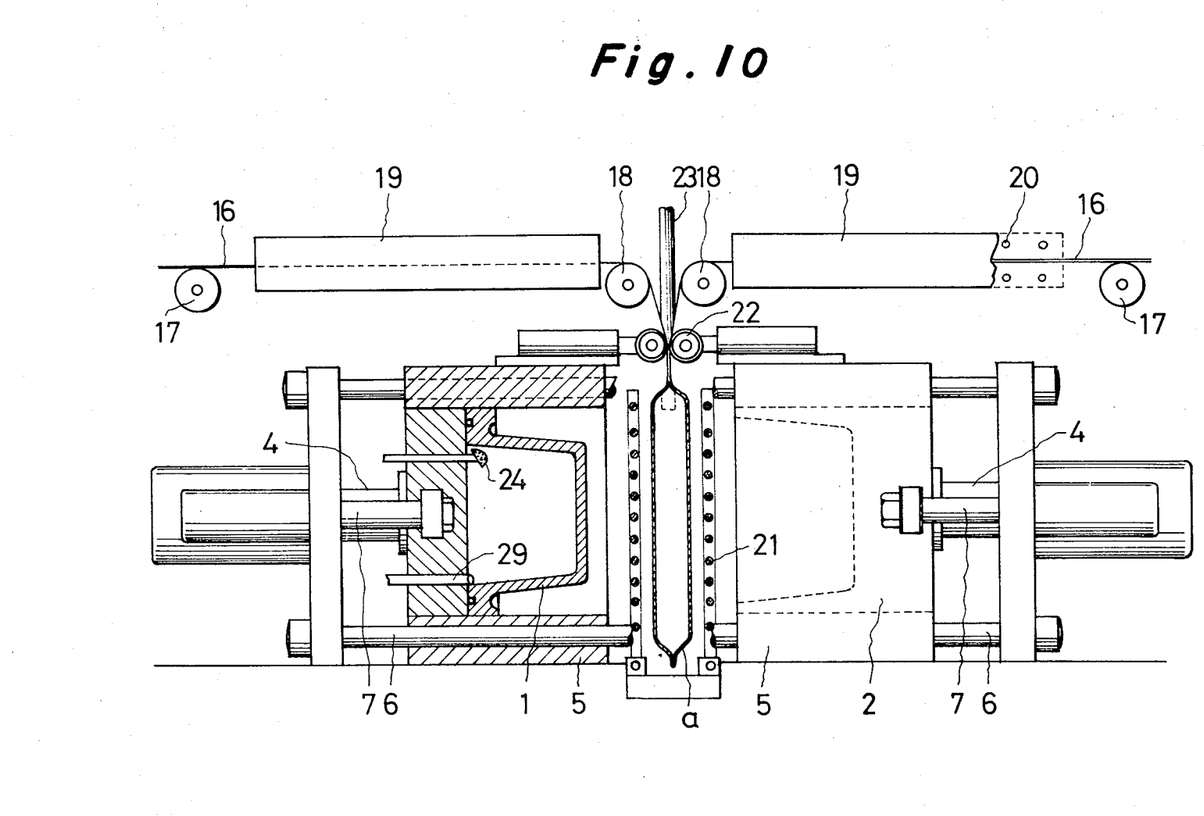
FIG. 10 is a front view, partly in cross-section, of an embodiment of the apparatus in which a bag-shaped material supplied to the mold closing device is formed from a plurality of webs of a resinous material opposed to each other.

More specifically, FIG. 10 shows webs 16 of a thermoplastic material each of which being supplied from opposite ends of a split mold by means of a draw-out roller 17, passed through a heating chamber 19 to be heated by heaters 20, and fed by a feed roller 18, so that the two webs 16 are suspended perpendicularly by the feed rollers 18 and disposed in face to face relation, with the mold closing line X—X being disposed therebetween in alignment therewith. Then, selvages of the two webs are fused and bonded together by heating rolls 22 while heated air is supplied through a heating air supply line 23 into a space between the two juxtaposed webs so as to prevent the central portions thereof from adhering to each other and form the webs into a predetermined bag-shape member a.

The bag-shaped member is further heated by movable heaters 21, so that its front and rear surfaces are heated to a temperature near the melting point. After the heaters 21 are withdrawn, movable shelly-shaped molds 5 slidably mounted on both the male member 1 and female member 2 of the split mold are moved by the hydraulic cylinders 7 toward a mold closing line X—X into engagement with each other, so that the outer shoulder portions of the bag-shaped member a are fused and bonded. At the same time, heated air under pressure is supplied to the interior of the bag-shaped member positioned in the limited space defined by the male and female members 1 and 2 of the split mold and the shelly-shaped molds 5 and the bag-shaped member is expanded. Then, the hydraulic cylinders 4 are actuated to gradually move the male and female members 1 and 2 at a slow rate toward each other so as to close the split mold while the air in the bag-shaped member is maintained at the predetermined pressure. Thus, the bag-shaped member is molded into a plastic article of bowl-shape. Means 24 and 29 are provided for circulating cooling water to and from the hollow interior of the male member 1 for effectively cooling the split mold.

The embodiment described above can be slightly modified so that, in place of using a plurality of webs of a thermoplastic material, these webs may be cut into sheets of a predetermined length beforehand and two sheets may be superposed one over the other. A mold releasing agent such as silicon oil, or a material in powder or particle form (calcium carbonate, for example) may be applied to opposed surfaces of two sheets of a thermoplastic material for preventing them from adhering to each other. An adhesive agent such as an emulsion of vinyl acetate may be applied to surfaces of the two sheets which are to be bonded together and foamed beads may be applied thereto when the article needs to have a foamed material in its hollow space. Then, the edges of the two sheets may be bonded by fusion so that the sheets may be formed into a predetermined bag-shaped member. Thereafter, the bag-shaped member may be heated by heaters or the like and supplied to a space between the members of a split mold as described herebefore, so that a plastic article having a triple-layer wall structure can be produced.

In another embodiment using a bag-shaped member in place of a parison extruded through the T-die of an extruding machine, a shelly-shaped hollow member of substantially the same volume as the bowl-shaped article may be produced by known blow molding techniques, and molded successively into a separate mold closing mechanism or allowed to stand to cool. Then, the blow-molded material is placed in a heating chamber and heated to a predetermined temperature (near the boiling point) which may vary depending on the type of material used. Thereafter, the heated and softened material is supplied to the limited space while connected to an air supply line and sealed by the members of a split mold. The material is thus made to conform to the shape and configuration of the inner walls of the closed mold while heated pressurized air or the like is supplied to the interior of the material through the air supply line. Thus, an article can be produced by molding as is the case with the embodiment described earlier above.

Figure 16:
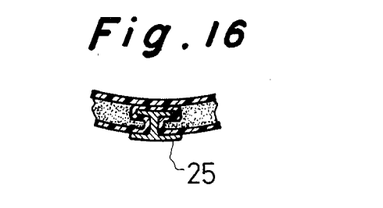
FIG. 16 is an enlarged view of the B portion of FIG. 15 showing a reinforcing member being attached to the outer wall.

In still another embodiment of this invention, an insert molding process may be employed in combination therewith. In this embodiment, a suitable additional member such as a reinforcing framework 25 of steel or the like, as in the illustrative boat 1 shown in FIGS. 14 to 16, may be embedded and fitted in the material to be molded simultaneously as the material is molded. In FIG. 15, a foamed resin 28 is filled between inner and outer walls 26 and 27 which are contiguous to each other.

In a further embodiment of the invention, a bowl-shaped article with a hollow space produced by the molding method of this invention may be formed into a highly heat insulating molded article with a triple wall structure by filling similar or dissimilar resin in the hollow space, and by then removing the outer and inner walls of such molded article so that the final molded article is formed by the filling itself.

Figure 18:
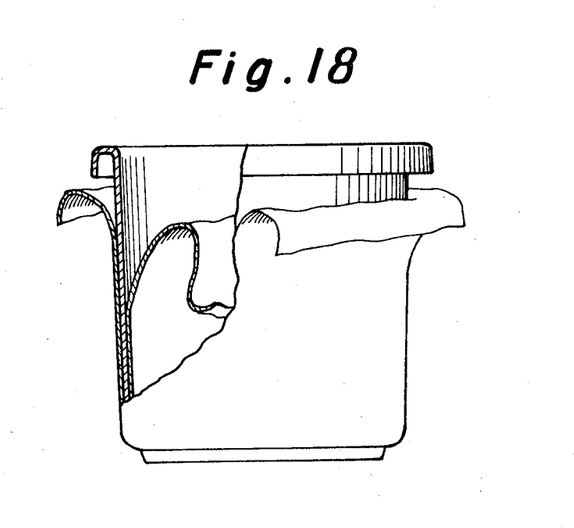
FIG. 18 shows partly in cross-section a molded article produced by molding a resinous material into a bowl-shaped article having a hollow space, pouring a fluid resinous material other than that from which such bowl-shaped article is molded into the hollow space thereof and allowing the fluid material to set, and stripping off the outer and inner shell of the article having a solidified resinous material layer.

More specifically, two air ducts are provided in a material to be molded into a hollow article of bowl-shape, and one of them, i.e. the inlet is connected to an injection molding machine or other suitable resin injection apparatus for filling the hollow space with a resin of suitable hardness while air or other gas is exhausted through the other duct, i.e. the outlet simultaneously as the split mold is closed and the material is made to conform to the shape and configuration of the inner walls of the mold. The inner mold resin may be any of the synthetic resins generally used in various molding operations and is usually selected from the group comprising phenol resins, polyurethanes, and polyester resins which may or may not have glass fibers mixed therein. Pouring and molding of the inner mold resin into the hollow space of the pail-shaped molded article shown in FIG. 18 may be effected while the latter is still in the mold in which it is molded or while it is disposed in a molding box after being removed from the mold in which it was molded and cooled.

Figure 17:
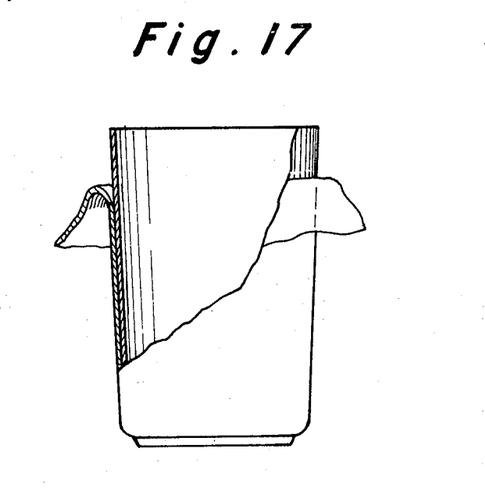
FIG. 17 is a front view partly in cross-section showing the manner in which a bowl-shaped plastic article having a hollow space produced by the method according to this invention is used as a matrix and a resinous material other than that used for producing the bowl-shaped article is poured into the hollow space the outer shell being removed to provide a molded article formed from the resinous material introduced into the hollow space.

When a bowl-shaped article is produced by filling a resin in a matrix as aforementioned, polyethylene or other synthetic resinous material which can readily be removed may be used for forming the outer and inner walls of the matrix, or a silicone resin or the like may be poured in the molded article, which subsequently serves as a matrix, while it is still in the mold and not cooled after the split mold is closed to effect the molding. The poured silicone resin is allowed to remain as a coating on the surfaces of the hollow section of the molded article and any excess resin is removed. Then, one of the aforementioned resinous materials is poured in the hollow space and molded. This process is effective to readily remove the surface walls of the molded article serving as the matrix (see FIGS. 17 and 18) so as to readily provide a molded article formed of the resinous material filled in the hollow space of the matrix.

Generally, the blow-molding process is advantageous in that the mold used is less expensive than the molds used in other molding processes. However, its disadvantage lies in the fact that it is difficult to produce articles which are accurate in wall thickness and other dimensions. On the other hand, articles molded by the ordinary molding process or the injection molding process permits to produce articles which are accurate in size and particularly have a predetermined and uniform wall thickness, but such process requires an expensive mold because the engaging surfaces of the mold must have precision finished and a molder of large capacity when articles of large size are produced.

The present invention retains the advantages of the molding processes of the prior art and obviates all of their disadvantages. More specifically, articles produced by the method according to this invention are molded by a process which, gives accurate dimensions and predeterminedly uniform wall thicknesses. Such articles are first produced as a bowl-shaped article having a hollow space by any of the various embodiments of the invention. Such bowl-shaped molded articles then may be used as a matrix and a resinous material may be poured into the hollow space of the article and then the outer and inner walls of the matrix are removed. Thus, unlike the ordinary molding process or injection-molding process, the method of this invention permits use of an inexpensive molding device and the revitalization of the material used for molding the matrix. It is within the present invention to use polyethylene as a material for molding a matrix when the article is made of polyester or other viscous material which is hard to remove from the mold upon completion of molding, to coat the inner surfaces of the hollow space with a layer of silicone resin to facilitate the removal of the molded article from the matrix, or to fill with a highly adhesive material the hollow space so as to produce a molded article of a triple wall structure.

It should be noted that various modifications of the present invention may be derived from the technical concept of this invention.

What is claimed is:

1. A method of producing by molding a bowl-shaped, plastic article, which comprises the steps of:
    (a) providing a split mold having male and female members, at least one of said members including a shelly-shaped mold slidably mounted thereon for engagement with the other member;
    (b) supplying a parison into a space between said male member and said female member of said split mold;
    (c) beginning to close said split mold by moving said shelly-shaped mold mounted on one of said members into engagement with the other member while holding said parison in position between said male and female member;
    (d) thereby closing by fusion upper and lower edge portions of said parison and confining said parison within a limited space defined by said shelly-shaped mold and by inner walls of said male and female members;
    (e) bringing said male and female members of said split mold into final engagement with each other to close said split mold;
    (f) introducing, concurrently with step (e), air under pressure into the interior of said parison, so as to cause said parison to engage fully the inner walls of said members and to conform to the shape and configuration thereof; and (g) removing the thus produced molded article from said mold.

2. The method according to claim 1 wherein each of said male and female members includes a shelly-shaped mold slidably mounted thereon, and wherein one said shelly-shaped mold is simultaneously moved into engagement with the other in step (c).

3. The method according to claim 1, wherein the pressure of the air introduced into said parison is maintained constant by venting some of the air while bringing said male and female members into final engagement with each other.

4. The method according to claim 1, wherein the molded article is further acceleratedly cooled after said split mold is closed, so as to facilitate the removal of the said produced article in a shorter time, said cooling being effected by providing an external and separate supply of air to said molded article.

5. The method of claim 1 wherein said supplying of said parison is effected by concurrently lowering into the space an extruding means and extruding said parison therefrom.

6. The method according to claim 1, wherein said parison consists of a bag-shaped member formed by a plurality of webs of thermoplastic material.

7. The method according to claim 1 wherein said parison-supplying step consists of drawing a pair of webs of thermoplastic material from rolling means, passing said webs through heating means, while supplying air intermediate the edge portions of said webs to prevent adhesion thereof, feeding the heated and aired webs through rollers in face-to-face relationship within said space in said split mold, and fusing the edge portion of said webs together to form a parison-like member.

8. The method according to claim 7, wherein said webs are separately precut into sheets of the desired length, and wherein adhesion-preventing material is applied to the opposing surfaces of two adjacent sheets prior to fusing the edge portions of said webs together.

References Cited

UNITED STATES PATENTS

| | | | |
|---|---|---|---|
| 3,452,125 | 6/1969 | Shorman et al. | 264—98 X |
| 3,334,164 | 8/1967 | Samuels et al. | 264—90 |
| 3,504,396 | 4/1970 | Button et al. | 264—99 X |

FOREIGN PATENTS

| | | | |
|---|---|---|---|
| 1,180,301 | 10/1964 | Germany | 264—98 |

ROBERT F. WHITE, Primary Examiner

J. H. SILBAUGH, Assistant Examiner

U.S. Cl. X.R.

156—156, 224, 285, 289, 555; 264—45, 96, 98, 221, 255, 274, 294; 425— 326 B